(12) United States Patent
Ott

(10) Patent No.: US 6,302,170 B1
(45) Date of Patent: Oct. 16, 2001

(54) AUTOMATICALLY CLOSING TANK CAP

(75) Inventor: Siegfried Ott, Hufschlag (DE)

(73) Assignee: Mecrom Ott U. Holey OHG, Hufschlag (DE)

(*) Notice: Subject to any disclaimer, the term of this patent is extended or adjusted under 35 U.S.C. 154(b) by 0 days.

(21) Appl. No.: 09/582,207

(22) PCT Filed: Dec. 29, 1998

(86) PCT No.: PCT/EP98/08499

§ 371 Date: Aug. 24, 2000

§ 102(e) Date: Aug. 24, 2000

(87) PCT Pub. No.: WO00/38941

PCT Pub. Date: Jul. 6, 2000

(51) Int. Cl.⁷ .................. B65B 1/04; B65B 3/04; B67C 3/00

(52) U.S. Cl. .......... 141/312; 141/301; 220/86.2; 220/DIG. 33

(58) Field of Search .................. 141/312, 301, 141/304, 348–350, 369, 370, 384; 220/86.2, DIG. 33

(56) References Cited

U.S. PATENT DOCUMENTS

| 5,720,328 | * | 2/1998 | Ott .......................... 141/312 |
| 5,732,840 | | 3/1998 | Foltz . |
| 5,829,495 | | 11/1998 | Corfitsen . |

* cited by examiner

Primary Examiner—Timothy L. Maust
(74) Attorney, Agent, or Firm—Nixon Peabody LLP; Thomas W. Cole (57) ABSTRACT

A self-closing filler cap (1) is provided for a fuel tank filler neck, wherein the neck includes a restrictive flap hinged thereto, the filler cap comprising a closure ring (2) for detachable mounting on the filler neck and a closure flap assembly (3) rotatively arranged on the closure ring (2), said closure flap assembly (3) comprising an annular member (12) and a closure flap (15) hinged thereto and a locking ratchet mechanism including at least one detent spring (18) and lugs (7) such that the closure flap assembly (3) is rotatable in one direction only wherein the at least one detent spring (18) and the lugs (7) are provided on the annular member (12) and the closure ring (2) respectively.

11 Claims, 5 Drawing Sheets

AUTOMATICALLY CLOSING TANK CAP

BACKGROUND OF THE INVENTION

1. Field of the Invention

The present invention relates to a self-closing filler cap for a fuel tank filler neck, the neck including a restrictive flap hinged thereto, the invention relating more particularly to a self-closing filler cap configured adapted for use with an automatic fuelling system.

2. Description of Prior Art

Such self-closing filler caps for automotive vehicle fuel tanks are known, they enabling the vehicle operator to fuel his vehicle without having to remove the filler cap from the filler neck.

Such filler caps generally comprise a cap body with either screw threads or a bayonet lock for securing the cap body onto the open end of the filler neck of the vehicle tank. The cap body has a centrally disposed opening for receiving the fuel nozzle of a corresponding fuel pump, this opening normally being covered by a spring-loaded closure flap hinged to the cap body. One such filler cap is screwed by the vehicle operator onto the filler neck of the fuel tank. To then fill the tank the fuel nozzle is inserted through the opening in the cap body to open the closure flap. After fuelling the fuel nozzle is removed from the opening of the cap body, resulting in the spring-loaded closure flap closing of its own accord. One such self-closing filler cap reads from and is claimed by U.S. Pat. No. 4,986,439, the entire text of which is expressly incorporated herein by reference.

When the fuel tank of an automotive vehicle is to be filled by an automatic fuelling system, for example by a robotic system, the fuel nozzle is no longer introduced by the vehicle operator through the opening of the cap body into the filler neck, but via a robotic arm capable of moving both vertically and horizontally for aligning the nozzle of a fuel pump with the filler neck of the fuel tank. Such alignment is faciliated by the use of a magnetic position sensor in the robotic arm. On completion of alignment the robotic arm extends the fuel nozzle towards the filler neck at an angle that is substantially at a right angle to the vehicle panel housing the filler neck. The robotic arm then extends the nozzle through the opening in the cap body and into the filler neck of the fuel tank by pushing down the closure flap in the cap. On vehicles that run exclusively on unleaded fuel, the fuel nozzle also needs to be extended through a second hinged flap in the filler neck before actual fuelling can commence On completion of automatic fuelling the robotic arm withdraws the fuel nozzle from the filler neck and out of the cap to allow both the restrictive flap in the filler neck and the closure flap in the cap to each resume its closed position.

In this arrangement it is necessary that the hinged mount of the restrictive flap in the filler neck and the hinged mount of the closure flap of the filler cap are arranged offset by approx. 180$_i$ to each other so that inserting the fuel nozzle into the filler neck as well as removing it therefrom and from the self-closing filler cap arranged thereon by the robotic arm can be sequenced so that no tilting or jamming at the restrictive flap or closure flap of the cap occurs. One particularly good example of such a self-closing filler cap for automatic fuelling reads from and is claimed by U.S. Pat. No. 5,720,328, the entire text of which is expressly incorporated herein by reference.

Although the filler cap claimed in this U.S. Pat. No. 5,720,328 has a proven record of success it has been found out that it cannot be put to use on all automotive vehicles, it having being discovered namely that the space available for applying the filler cap to the filler neck of the fuel tank is very small on some vehicles. This may then result in the hinged body lid closing off this space for access to the filler neck coming into contact with the filler cap secured to the filler neck.

SUMMARY OF THE INVENTION

The present invention is thus based on the object, in eliminating this problem, of providing a self-closing filler cap which is particularly suitable for automatic fuelling and is characterized by having a compact design taking up little space and is vested with high strength since it needs to be reckoned with that the robotic arm employed in automatic fuelling may yank the fuel nozzle from the filler cap without thereby damaging the filler cap.

To achieve this object the invention comprises the features as they read from claim 1. Advantageous aspects thereof read from the further claims.

The invention is based on the knowledge that the diameter of an opening for inserting the fuel nozzle into the filler neck cannot be changed and thus the components needed to configure the filler cap and more particularly their functional faces need to be arranged radially inwards as far as possible for the filler cap quite generally circular in shape to achieve a compact design of the filler cap and thus also to enhance the rugged performance of the filler cap.

In accordance with the invention a self-closing filler cap for a fuel tank filler neck is provided in which the filler neck has a restrictive flap hinged thereto, the filler cap comprising a closure ring for releasable assembly on the neck and a closure flap assembly rotatively arranged on the closure ring and a closure flap hinged thereto and a locking ratchet mechanism including at least one detent spring and lugs such that the closure flap assembly is rotatable in one direction only, the at least one detent spring and the lugs being provided on the annular member and on the closure ring respectively. This assembly of the detent spring(s) on the annular member of the closure flap assembly achieves an assembly in which the detent springs may be arranged radially inwards to such an extent that the space taken up by the filler cap in accordance with the invention may be significantly reduced. The lug(s) assigned to the detent spring(s) is/are provided integrally on the closure ring so that the closure ring is configurable totally in one piece, i.e. without any components molded to the closure ring via parting faces or the like, thus also resulting in the closure ring being simple to manufacture.

In this arrangement the lugs provided on the closure ring may be configured on an annular face substantially equispaced circumferentially, i.e. in other words an annular functional face is provided on the closure ring on which the lugs are configured integrally to cooperate with the detent spring(s) arranged on the closure flap assembly so that relative to the closure ring arranged on the filler neck of the fuel tank the closure flap assembly has substantially full freedom of rotation in the direction provided for rotation whilst being blocked in the other direction.

This now enables the vehicle operator to define the filler cap in accordance with the invention via for example threads or a bayonet lock on the filler neck of the fuel tank such that the filler cap is screwed on in the substantially freely rotative direction on the filler neck to such an extent that it is fixedly arranged thereon and further rotation of the filler cap resulting in the closure flap assembly being turned relative to the closure ring so that any stronger screwing on of the filler cap on the filler neck of the fuel tank is no longer possible. When the filler cap in accordance with the invention is to be turned in the opposite direction to remove it from the filler neck of the fuel tank no movement of the closure flap assembly relative to the closure ring is possible so that the filler cap is removable from the filler neck. By turning the closure flap assembly relative to the closure ring the closure flap hinged to the annular member of the closure flap assembly may be turned relative to the restrictive flap hinged to the neck so that the hinging point of the restrictive flap and the hinging point of the closure flap are diametrally opposed by $180_i$. This makes it possible for the robotic arm employed in the automatic fuelling system to insert the fuel nozzle without tilting through the opening covered by the closure flap of the annular member and through the opening covered by the restrictive flap of the filler neck and to extract it therefrom. By the integral configuration of the detent springs on the annular member and the lugs on the closure ring a highly compact design is achieved since the detent springs are located at the opening diameter of the closure ring needed for inserting the fuel nozzle radially far inwards to thus make it possible that also the associated lugs on the closure ring configured with a smaller diameter may be provided to permit achieving a both compact and rugged design.

In this arrangement several detent springs are provided on the annular member substantially equispaced circumferentially, the detent springs comprising at their side assigned to the lugs a sliding face inclined in the direction of rotation of the closure flap assembly, this sliding face being slidable beyond the lugs on flexing of the detent springs. A sliding face configured complementary to the sliding face of the detent springs is likewise configured at the lugs. It is on this sliding face that the sliding faces of the detent springs are slidable in the free direction on rotation of the closure flap assembly so that via a movement of the sliding faces of the detent springs and of the lugs on each other rotation of the closure flap assembly relative to the closure ring is possible whilst any rotation of these two components oriented in the opposite direction relative to each other is blocked. It is via the flexing of the detent springs configured on the annular member that a defined force opposing the free rotative movement is built up which is felt by the vehicle operator in securing the filler cap in accordance with the invention to the filler neck of the fuel tank indicating that once this force has occurred it is necessary only to turn the closure flap assembly sufficiently until the hinging point of the closure flap diametrally opposes the hinging point of the restrictive flap by $180_i$.

In a further aspect of the invention it is provided for, however, that the lugs at the inner circumference and at the outer circumference of the annular face are surrounded by a stopper collar preventing lateral deflection of the detent springs.

At the annular member of the closure flap assembly rib-like protuberances extending from the circumferential surface outwardly in the axial direction of the annular member may be provided which are engageable with complementary recesses in the inner circumferential surface of a cover for the filler cap, so that in other words an upper part and a cover with guide faces for the fuel nozzle to be inserted into the filler cap are mountable on the closure flap assembly such that the upper part is defined at the protuberances. A rotary movement of the upper part then results in a corresponding rotary movement of the closure flap assembly, enabling the closure flap to be oriented relative to the restrictive flap by ways and means as already described above.

Protuberances may be configured at the circumferential surface of the annular member on the inner side which are engageable with the upper side of the outer stopper collar of the annular face of the rotative mount of the closure flap assembly on the closure ring, as a result of which the closure ring is engageable with the closure flap assembly so that a fixed axial point of the closure flap assembly is achieved at the closure ring and the closure flap assembly remains rotatable relative to the closure ring in one direction, any relative rotation in the other direction being prevented by the cooperation of the detent springs and the lugs.

In this arrangement it is provided for that the upper side of the annular member is provided with an annular protruding section contacting the aforementioned closure flap in a spring-loaded seal, for this purpose a sealing ring or the like possibly being provided on the closure flap. The spring provided for biasing the closure flap in this arrangement is mounted at the inner side of the protruding section. In the region of the mounting arrangement for the closure flap the filler cap also comprises a venting means which is opened at a predefined internal pressure of the fuel tank to thus avoid a prohibitively high overpressure materializing in the fuel tank.

BRIEF DESCRIPTION OF DRAWINGS

The invention will now be detailed with reference to the drawing in which.

DETAILED DESCRIPTION

Figure 1:
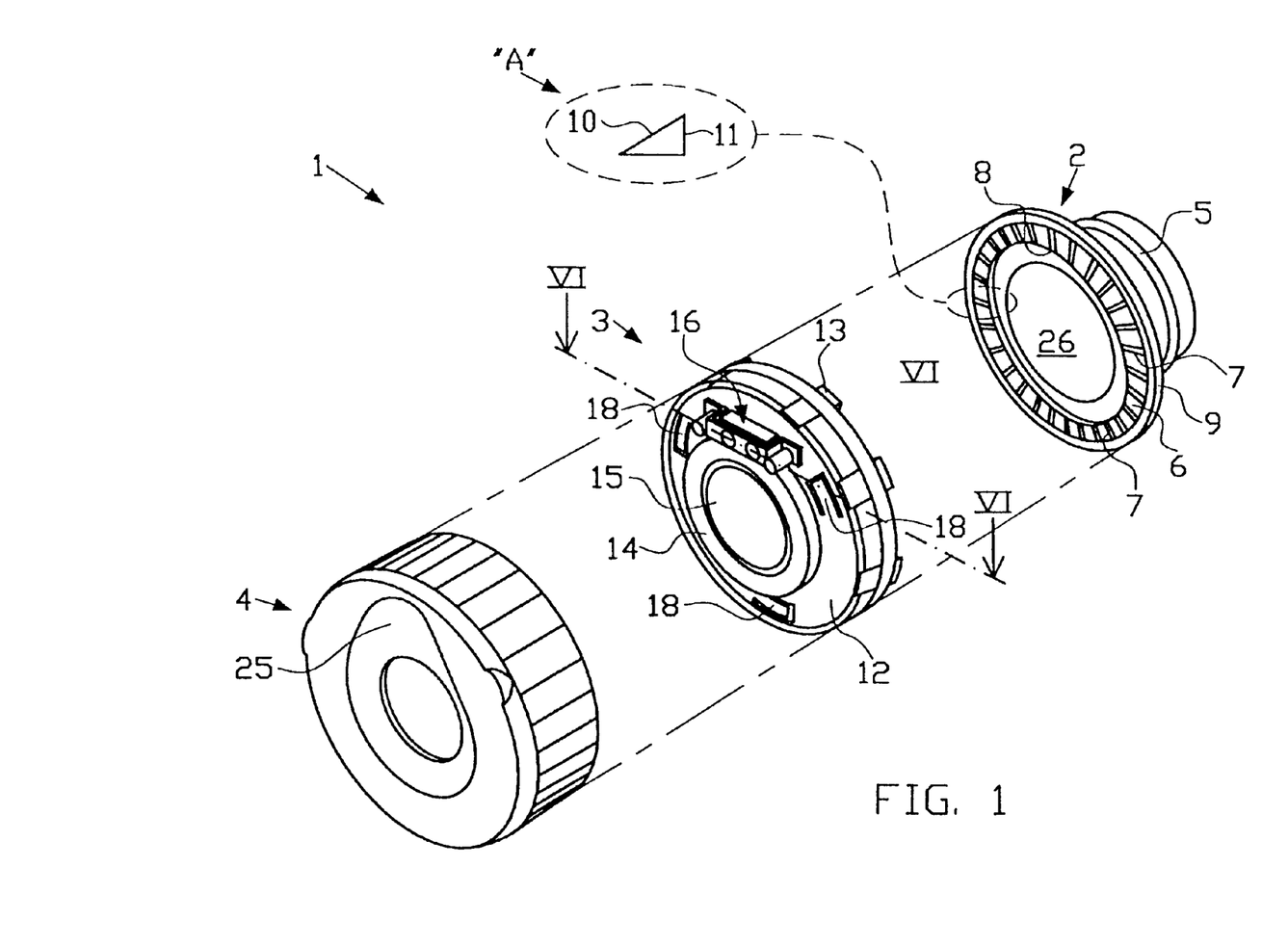
FIG. 1 is an exploded view in perspective of the self-closing filler cap in accordance with the invention including a cover, a closure flap assembly and a closure ring combined to form the filler cap.

Referring now to FIG. 1 there is illustrated an embodiment of the self-closing filler cap 1 in accordance with the invention comprising a closure ring 2, a closure flap assembly 3 and a cover 4.

The filler cap 1 is attachable on the filler neck of a fuel tank of an automotive vehicle by a thread 5 arranged on the tubular configured closure ring 2. As an alternative to the thread 5 as shown in FIG. 1 a bayonett lock may also be configured on the closure ring 2.

At its upper side facing the closure flap assembly 3 the closure ring 2 comprises an annular face 6 at which lugs 7 are configured equispaced circumferentially. These lugs 7 serve in conjunction with detent springs detailed further on to orient the hinging point of a closure flap 15 arranged at the closure flap assembly 3 relative to a restrictive flap arranged in the filler neck of the fuel tank.

Since the lugs 7 extend radially by only a very small amount it is possible to configure the inner and outer diameter of the annular face 6 as compared to that of the filler cap as known from U.S. Pat. No. 5,720,328 very small, resulting in a highly compact design of the filler cap as a whole. At its inner circumference the annular face 6 is provided with a stopper collar 8 opposite which likewise at the outer circumference a stopper collar 9 is provided. Both collars serve as stoppers for the detent springs as aforementioned and to be detailed in the following.

As evident from the detail A as shown in FIG. 1 the lugs 7 incorporate a sliding face 10 oriented inclined in the direction of rotation of the closure flap assembly 3 at which corresponding sliding faces configured on the detent springs are able to slide. Any rotation of the closure flap assembly 3 at the closure ring 2 in the opposite direction is, however, prevented beyond the stopper face 11 configured of the lugs 7.

The closure flap assembly 3 incorporates an annular member 12 at the outer circumference of which rib-like protuberances 13 extend in the axial direction of the annular member 12 and which are engageable with complementary configured recesses in the inner circumferential surface of the cover 4 of the filler cap to produce a non-positive connection between the cover 4 and the closure flap assembly 3 to enable the filler cap 1 arranged on the filler neck to be rotated.

Arranged at the inner circumferential surface of the annular member 12 is an annular protruding section 14 serving to receive a spring-loaded closure flap 15.

Figure 2:
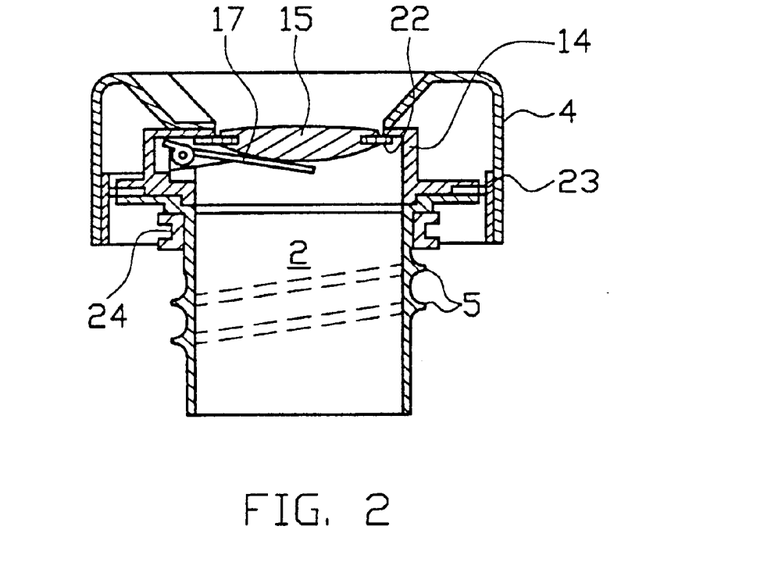
FIG. 2 is a section through a filler cap.

Referring now to FIG. 2 there is illustrated the annular member 12 urged by a spring 17 from within against the annular protruding section 14 as will now be detailed. In this arrangement the spring 17 is mounted below the annular protruding section 14 on the closure flap assembly 3. Provided in the region of the mount for the closure flap assembly 3 is a vent means 16 serving to vent the fuel tank should a prohibitively high pressure materialize therein, for example, due to high temperatures or damage in the fuel tank, which can then be relieved via the vent means 16. Arranged on the rear side of the cover 4 facing the closure flap assembly 3 are magnets (not shown) which in conjunction with a robotic arm of a sensor means belonging to an automatic fuelling system permit automatic alignment of nozzle and tank.

Figure 3:
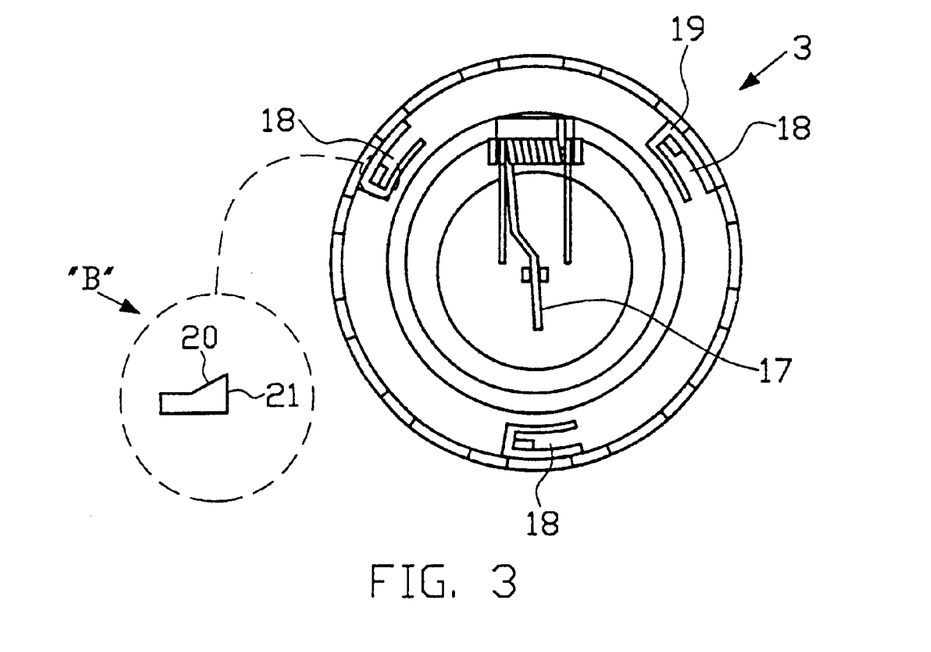
FIG. 3 is a view from underneath of a closure flap assembly.

Referring now to FIG. 3 there is illustrated configured on the annular member 12 in the embodiment as shown three detent springs 18 spaced circumferentially in recesses 19 of the annular member 12 which cooperate with the lugs 7 configured on the annular face 6 of the closure ring 2.

As evident from FIG. 3 in more detail the detent springs 18 are provided with sliding faces 20 for sliding on the sliding faces 10 of the lugs 7 on rotation of the closure flap assembly 3 at the closure ring 2 so that the detent springs 18 are flexed by the sliding faces 20 at the sliding faces 10 of the lugs 7, beyond which they snap into place when the sliding faces 20 no longer contact the sliding faces 10. On rotation of the closure flap assembly 3 in the opposite direction at the closure ring 2 the stopper face 21 of the detent springs 18 is stopped by the stopper face 11 of the lugs 7 so that any rotation of the closure flap assembly 3 in this direction is blocked.

The configuration of the detent springs 18 on the annular member 12 results in the closure flap assembly 3 taking up significantly less space than is the case with known filler caps.

FIG. 2 shows a section illustration of the composed filler cap 1 in accordance with the invention.

The closure flap 15 is urged via the spring 17 against the annular protruding section 14, sandwiching a sealing disk 22. In operation the closure flap 15 is hinged aside by a fuel nozzle introduced into the filler cap 1 such that the closure flap 15 is urged downwards against the force of the spring 17 in the position as evident from FIG. 2. The cover 4 is provided at its inner circumferential surface with recesses 23 which are latchable with the rib-like protuberances 13 configured on the closure flap assembly 3 when the cover 4 is fitted thereto. The fully assembled filler cap 1 can be screwed by the vehicle operator onto the filler neck of the fuel tank via the thread 5 so that the seal 24 sealingly contacts the underside of the closure flap assembly 3 on the filler neck. Fitting the filler cap 1 to the filler neck is done such that the filler cap 1 is defined on the filler neck by the thread 5 or a bayonett lock. When the filler cap 1 is, for example, firmly screwed in place, all that is the needed is to orient the closure flap 15 relative to a restrictive flap arranged in the filler neck of the fuel tank such that the hinging points of the closure flap 15 and restrictive flap are disposed $180_i$ relative to each other. For this purpose the vehicle operator of the filler cap 1 merely needs to turn the filler cap 1 fitted to the filler neck of the fuel tank in the direction released by the locking ratchet mechanism until this position is attained. This requires him to firmly grip the filler cap 1 via the cover 4, the outer wall of which is provided fluted and to turn the closure flap assembly 3 clockwise relative to the closure ring 2 in the direction released from the lugs 7 and detent springs 18 until the cited angular relationship is attained between the hinging point of the closure flap 15 and that of the restrictive flap arranged in the filler neck. In this position the vee nick 25 configured on the front side of the cover 4 is located upwards.

By the configuration of the detent springs 18 on the annular member 12 of the closure flap assembly 3 it is now possible to arrange them radially far inwards relative to the insertion opening 26 required for introducing the fuel nozzle so that the lugs 7 configured on the closure ring 2 are also located radially far inwards to thus achieve a highly compact design of the closure ring 2 and closure flap assembly 3 and thus of the filler cap 1 as a whole.

Referring now to FIG. 4 and FIGS. 5A–5C the functioning and use of the invention will now be detailed. In the first step in making use of the invention the combination of the closure ring 2 and closure flap assembly 3 is screwed on or otherwise secured to the upper end of a filler neck 27 of an automotive vehicle. If the filler neck 27 comprises a restrictive flap 28 secured to the inner diameter of the filler neck 27 by means of a hinging connection 29 or hinging point the locking ratchet mechanism is made use of to turn the closure flap assembly 3 relative to the closure ring 2 so that the hinging point of the closure flap 15 (by the 12 o'clock position which may be provided on the front side of the annular member 12) through $180_i$ relative to the hinging connection 29 arranged between the restrictive flap 28 and filler neck 27.

Figure 4:
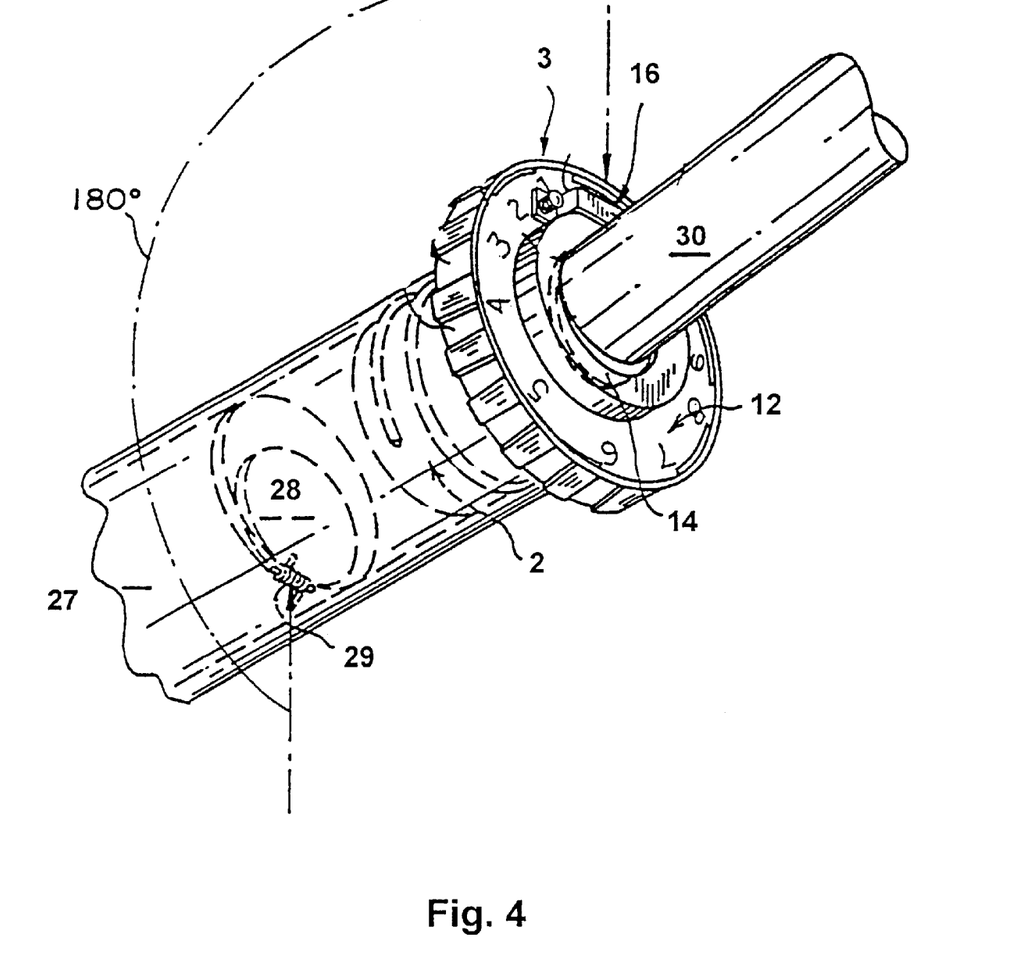
FIG. 4 is a view in perspective of a filler cap (omitting a cover) the closure flap assembly of which has been fitted to the closure ring such that the hinging point of the closure flap is arranged disposed by $180_i$ opposite the hinging point of the restrictive flap.

Orienting the hinging locations opposite each other in this way aligns the flaps 15 and 28 to enable the fuel nozzle 30 to be inserted far enough into the filler neck 27 for filling the fuel tank (not shown). This orientation also minimizes the risk of the fuel nozzle 30 protruding through both the closure flap 15 and restrictive flap 28 becoming jammed between the edges of the flaps 15, 28 on being extracted.

Figures 5A, 5B, 5C:
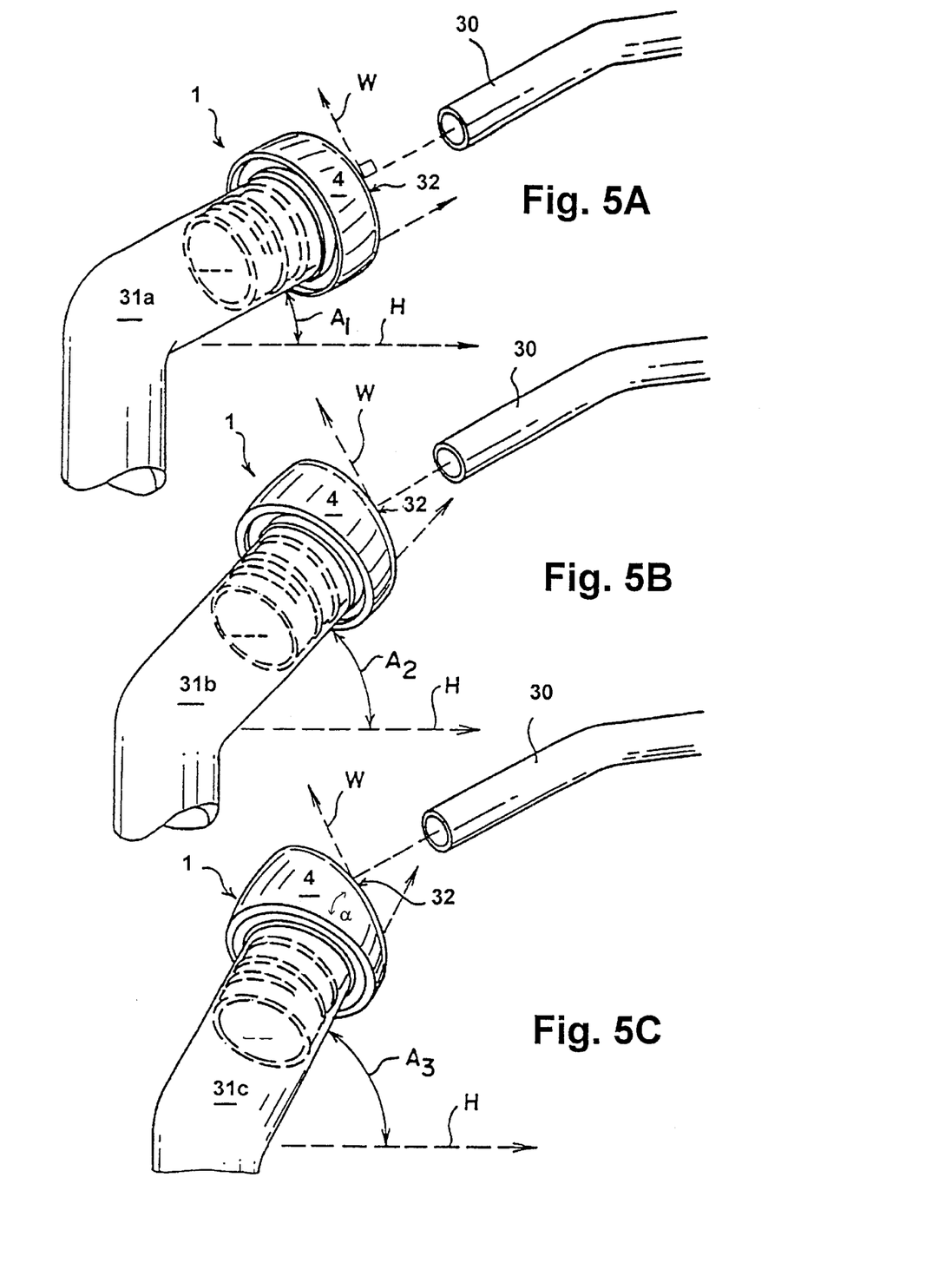
FIGS. 5A, 5B and 5C illustrate how the closure ring and the closure flap assembly of the cap may be equipped with covers for the cap including guide faces oriented at differing angles to ensure compensation for the filler neck arranged at differing angles to facilitate insertion of a filler neck and nozzle resp. into the cap.

From FIGS. 5A–5C it is evident how the suitable inclination and orientation of the cover 4 can be made use of to facilitate inserting the nozzle 30 into the cap 1, these Figures illustrating differing filler necks 31a, b, c, each of which is located at a differing angle A1, A2, A3 to the horizontal H.

In a situation in which this angle is relatively small, as is the case for the filler neck 31a as shown in FIG. 5a, an upper wall 32 is inclined substantially orthogonally relative to a cylindrical assembly section of the cover 4, thus making it easy to orient the fuel nozzle 30 in introducing it through the circular opening 26 covered by the closure flap 15 and through the closure flap assembly 3. If, however, the filler neck is oriented more vertically, as is the case with the filler neck 31b as shown in FIG. 5B, orienting and inserting the fuel nozzle in such a way becomes more difficult due to the angle between the nozzle 30 and the passage opening in the cover 4. Accordingly the upper wall 32 of the filler cap 1 is configured at such an angle to the face of the annular member of the closure flap assembly 3 that the angular orientation between the upper wall 32 and the end of the nozzle 30 is substantially orthogonal now as then. In case the filler neck is oriented even more vertical, as evident in the case of the filler neck 31c as shown in FIG. 5C, the upper wall 32 is configured at an even greater angle to the annular member 12 of the closure flap assembly 3. Providing such a steeper angle permits in turn the end of the nozzle 30 to engage a guiding face formed by the upper wall 32 at a substantially orthogonal angle of engagement. Such an orthogonal angle of engagement is especially important when the vehicle to which the filler neck belongs is to be fuelled by an automatic fuelling system having a nozzle 30 which is inserted and withdrawn at an angle which is substantially orthogonal to the wall W of the body panel housing the filler cap 1.

Now that the significance of the angle for engaging the nozzle 30 and filler cap 1 has been explained, the assembly sequence will now be detailed. After the closure flap assembly 3 has been fitted over the closure ring 2, as already explained with reference to FIG. 4, the vehicle operator needs to fit the cover 4. To carry out this step the vehicle operator first needs to determine the extent of the angle between the filler neck and the horizontal H. In cases in which the filler neck is oriented at only a small angle A1 a cover 4 can be selected with a substantially orthogonally oriented upper wall 32 for good results, whereas in cases in which the filler neck is oriented at a larger angle (FIG. 5c) relative to the horizontal H (as is the case as shown in FIGS. 5B and 5C) a cover 4 is selected whose upper wall 32 is configured at an angle (see angle □) whereby the extent of the angle depends on the angle A2, A3 between the filler neck 31b, 31c and the horizontal H. To orient such an angularly configured cover correctly over the closure flap assembly 3 the vehicle operator employing the filler cap 1 aligns the vee nick 25 so that it is arranged oriented upwards.

Figure 6:
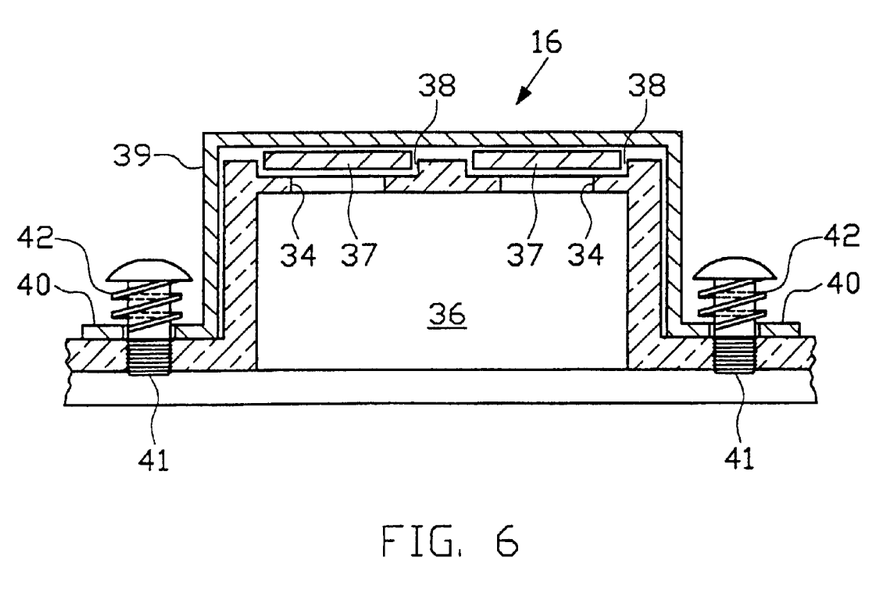
FIG. 6 is section taken along the line VI—VI as shown in FIG. 1 to illustrate the venting means.

Referring now to FIG. 6 there is illustrated a vent means 16 to prevent overpressure materializing in the fuel tank. In this arrangement the vent means 16 in the embodiment as shown serves to deplete any overpressure as soon as the pressure in the tank exceeds a value of 11 kPa. For this purpose the venting means includes two apertures 34 in the upper wall 35 of a mounting bracket 36. Two valve elements in the form of valve discs 37 are arranged over the apertures 34, each of the discs being arranged in an annular valve seat 38 surrounding each of the apertures 34.

A yoke member 39 clasps the two valve discs and comprises in its foot portion 40 holes penetrated by pins 41.

Arranged on the pins 41 are springs 42 biased via the pin heads. When an overpressure situation materializes in the tank the pressure acting on the valve discs 37 through the apertures 34 becomes so high that the spring force of the two springs 42 is overcome and the yoke member 39 is unseated to allow the pressure to escape until pressure equalization again exists between the pressure in the tank and the springs 42 and the valve discs 37 are reseated via the yoke member 39.

By suitably selecting the stiffness of the springs 42 the opening pressure of the vent means 16 can be set, i.e. in a range from 10 kPa to 100 kPa, preferably from 30 kPa to 60 kPa. The diameter of the apertures 34 is selected so that a venting rate of 100 to 200 liters per minute, preferably approx. 160 liters per minute is attained.

The valve discs 37 may be made of vinyl fluoride or an elastomer such as, for example, nitrile rubber (NBR).

The individual components of the filler cap, such as for example the closure ring 2, closure flap assembly 3 and cover 4 may be made of a polyamide, preferably PA 6 containing 20 to 30% by volume of carbon fibers to obtain a resistance of approx. 50 kOhm to avoid static charging of the filler cap.

Although the invention has been explained by way of a preferred embodiment, the person skilled in the art will readily appreciate that supplements, modifications or changes not detailed in the present invention are expressly included within the scope thereof with reference to the claims and the drawing.

What is claimed is:

1. A self-closing filler cap for a fuel tank filler neck, wherein said neck (27) includes a restrictive flap (28) hinged thereto, comprising a closure ring (2) for detachable mounting on said filler neck (27) and a closure flap assembly (3) rotatively arranged on said closure ring (2), said closure flap assembly (3) comprising an annular member (12) and a closure flap (15) hinged thereon and a locking ratchet mechanism including at least one detent spring (18) and lugs (7) such that said closure flap assembly (3) is rotatable in one direction only wherein said at least one detent spring (18) and said lugs (7) are provided on said annular member (12) and said closure ring (2) respectively.

2. The filler cap as set forth in claim 1 wherein said lugs (7) are configured on said closure ring (2) at an annular face (6) substantially equispaced circumferentially.

3. The filler cap as set forth in claim 1, wherein several detent springs (18) are configured on said annular member (12) substantially equispaced circumferentially.

4. The filler cap as set forth in in claim 1, wherein at their side assigned to said lugs (7) said detent springs (18) are provided with a sliding face (20) oriented inclined in the direction of rotation of said closure flap assembly (3) and which slides beyond said lugs (7) on flexing of said detent springs (18).

5. The filler cap as set forth in claim 1, wherein said lugs (7) comprise a sliding face (10) configured complementary to said sliding face (20) of said detent springs (7) on which said sliding face (20) of said detent springs (7) is slidable in the free direction on rotation of said closure flap assembly (3).

6. The filler cap as set forth in claim 1, wherein said lugs (7) at the inner circumference and outer circumference of said annular face (6) are surrounded by a stopper collar (8, 9) preventing lateral deflection of said detent springs (18).

7. The filler cap as set forth in claim 1, wherein rib-like protuberances (13) extending from a circumferential surface outwardly in the axial direction of the member (12) are provided at said annular member (12) which are engageable with complementary recesses (23) in an inner circumferential surface of a cover (4) of said filler cap.

8. The filler cap as set forth in claim 1, wherein protuberances are configured at the inside circumferential surface which are engageable with the upper side of a stopper collar (9) of said annular face (6) for rotatably securing said closure flap assembly (3) to said closure ring (2).

9. The filler cap as set forth in any of the claims 1 to 8 wherein the upper side of said annular member (12) is provided with an annular protruding section (14) sealingly contacting said closure flap (15) spring-loaded.

10. The filler cap as set forth in claim 9 wherein a spring (17) is provided for biasing said closure flap (15) at the inner side of said protruding section (14).

11. The filler cap as set forth in claim 1, wherein at said annular member (12) a vent means (16) is arranged which is opened at a predefined internal pressure of said fuel tank.

\* \* \* \* \*